2 Sheets—Sheet 1.

T. T. FRYER.
AUTOMATIC EXTINGUISHER FOR GAS-BURNERS.

No. 186,672. Patented Jan. 30, 1877.

Witnesses:
Charles J. Buchheit
George H. Sykes

Inventor:
T. T. Fryer
By Edward Wilhelm
Attorney.

2 Sheets—Sheet 2.

T. T. FRYER.
AUTOMATIC EXTINGUISHER FOR GAS-BURNERS.

No. 186,672. Patented Jan. 30, 1877.

Witnesses:
Charles J. Buchheit
George H. Sykes

T. T. Fryer, Inventor
By Edward Wilhelm
Attorney.

N. PETERS, PHOTO-LITHOGRAPHER, WASHINGTON, D. C.

UNITED STATES PATENT OFFICE.

THOMAS T. FRYER, OF BUFFALO, NEW YORK.

IMPROVEMENT IN AUTOMATIC EXTINGUISHERS FOR GAS-BURNERS.

Specification forming part of Letters Patent No. 186,672, dated January 30, 1877; application filed September 7, 1876.

*To all whom it may concern:*

Be it known that I, THOMAS T. FRYER, of the city of Buffalo, in the county of Erie and State of New York, have invented certain Improvements in Automatic Extinguishers for Gas-Lamps, which improvements are fully set forth in the following specification, reference being had to the accompanying drawings.

My invention relates to a device for turning off the gas automatically after a predetermined period of time has expired.

The nature of my invention will be fully understood from the following description.

Figure 1:
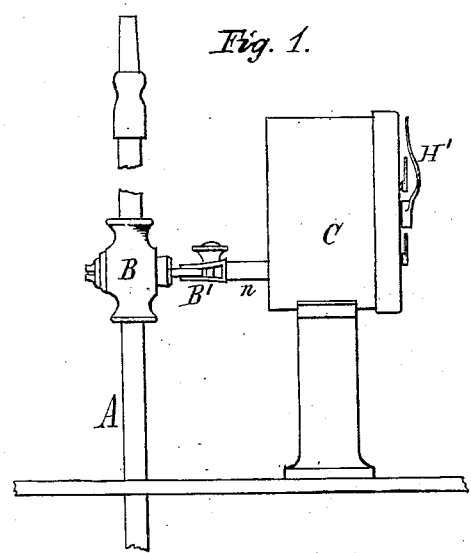
Figure 2:
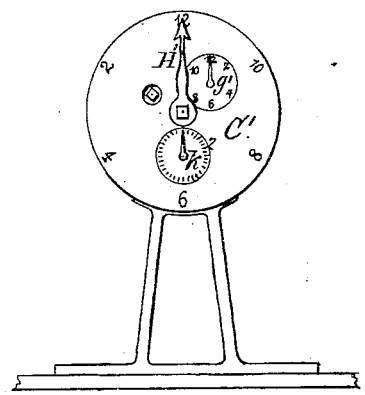
Figure 3:
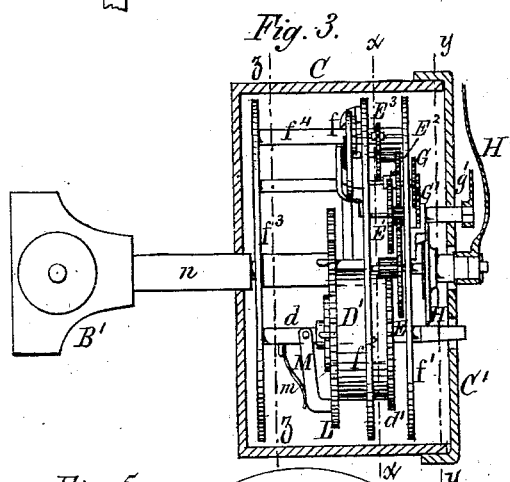
Figure 4:
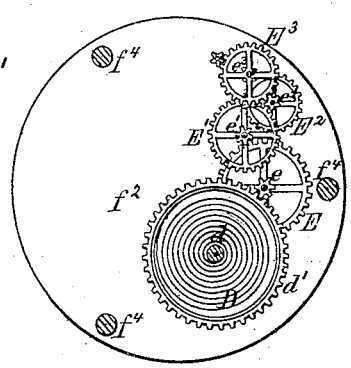
Figure 5:
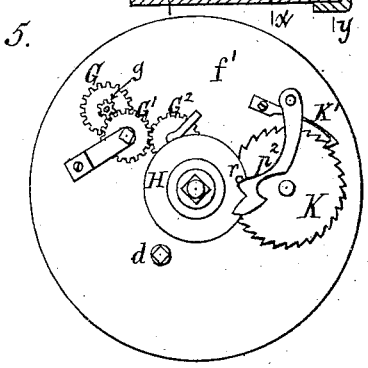
Figure 6:
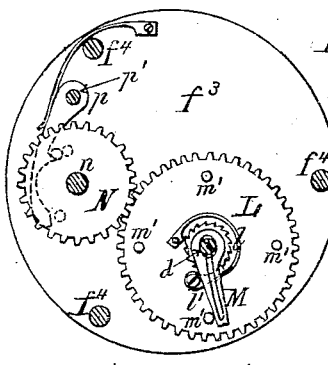
Figure 7:
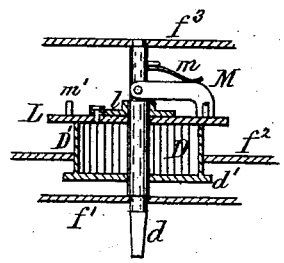
Figure 8:
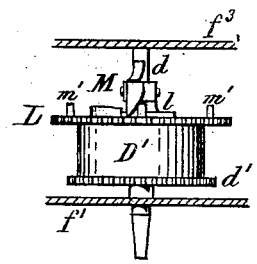
Figure 11:
Figure 9:
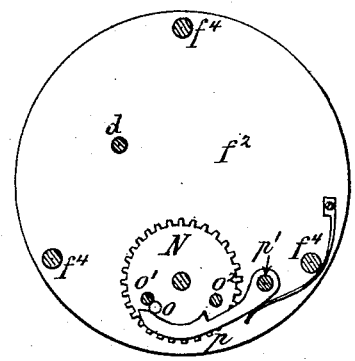
Figure 10:
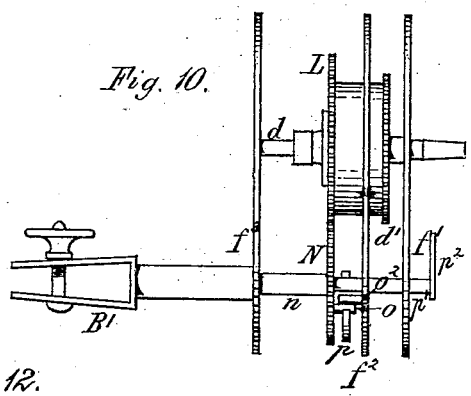
Figure 12:
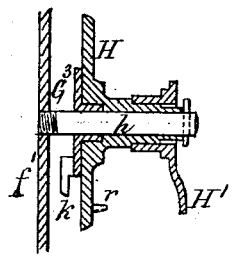

In the accompanying drawings, consisting of two sheets, Figure 1 is a side elevation of my improved apparatus as applied to a gas-lamp. Fig. 2 is a front view thereof. Fig. 3 is a plan view of the apparatus, with the outer case in section. Fig. 4 is a view in line $x\,x$, Fig. 3, of the mainspring and connecting-train of gear-wheels. Fig. 5 is a view in line $y\,y$, Fig. 3, showing the mechanism underneath the dial-plate. Fig. 6 is a view in line $z\,z$, Fig. 3. Fig. 7 is a sectional view of the mainspring and connecting parts. Fig. 8 is a side elevation thereof. Fig. 9 is a view similar to Fig. 6, showing the position of the parts when the gas is turned off. Fig. 10 is a side elevation corresponding with Fig. 9. Fig. 11 is a rear view of the disk, to which the main index-hand is attached. Fig. 12 is a section thereof, on an enlarged scale.

Like letters of reference refer to like parts in each of the figures.

A represents the gas-pipe, and B the cock controlling the flow of the gas. C represents the outer case of the apparatus, and C' the dial-plate thereof. D represents the main-spring, secured with one end to a shaft, $d$, and attached with the other to a casing, D', carrying a gear-wheel, $d'$. The latter drives a train of gear-wheels, E E$^1$ E$^2$ E$^3$, provided with pinions $e\,e^1\,e^2\,e^3$, and the wheel E$^3$ connects with an escapement, $f$, of any common and well-known construction, so as to properly regulate the movement of the train of gears. The different wheels are mounted in a framework, composed of three circular plates or disks, $f^1\,f^2\,f^3$, connected by stay-bolts $f^4$. The shaft of the wheel E$^1$ extends through the first plate, $f^1$, and carries on the front side thereof a gear-wheel, G, which, by means of a pinion, $g$, drives a gear-wheel, G$^1$, which latter, by means of an intermediate gear, G$^2$, drives a gear-wheel, G$^3$, of the same size as the wheel G$^1$, so that the latter and the wheel G$^3$ rotate with the same speed. The wheel G$^3$ is provided with a hub, which is fitted into the disk H, so that the latter is rotated from the wheel G$^3$ by means of frictional contact only.

The disk H is provided with a long outwardly-extending hub, to which the main index-hand H' is secured, and which turns loosely upon an arbor, $h$, arranged centrally upon the plate $f^1$.

K is a ratchet-wheel, provided with thirty, or any other desired number of, teeth, and actuated by a tooth, $k$, projecting from the wheel G$^3$, so that the wheel K is moved one notch for every revolution of the wheel G$^3$. Any retrograde movement of the wheel K is prevented by a spring-detent pawl, K'. The shafts of the wheels G$^1$ and K are provided with index-hands, marked, respectively, $g^1$ and $k^2$, indicating upon the dial-plate C$^1$ the arc of a circle through which these wheels have moved.

L represents a gear-wheel turning loosely upon the shaft $d$, and resting against the open end of the mainspring-case D'. $l$ is a ratchet-wheel secured to the shaft $d$ in contact with the wheel L, and $l'$ a spring-pawl pivoted to the wheel L, and engaging with the ratchet-wheel $l$, so as to prevent any retrograde movement of the shaft $d$ as the mainspring is wound up. M is a dog or arm pivoted to the shaft $d$ above or in the rear of the wheel L, so as to rotate therewith, while being capable of swinging toward and from the wheel L. It is held with its free end in contact with the wheel L by a spring $m$. $m'$ are projecting pins or stops arranged at suitable distances apart on the side of the wheel L, in such manner that the end of the arm M will come in contact with these pins. One side of the end of the arm M is beveled off, as shown in Fig. 8, so that the arm will ride over these pins, as the spring is wound up, while the other side of the arm is made perpendicular, so as to form a positive stop against the pins $m'$. N is a gear-wheel engaging with the wheel L, and mounted on a rock-shaft, $n$, which latter is connected with the plug of the stop-cock B by means of a screw-clamp, B', or in any other suitable manner. The wheel N is provided on its side with a projecting stop-pin, $o$, oscillating between two stops, $o^1 o^2$, arranged on the plate $f^2$ in such manner as to permit the wheel N to make about one-quarter of a revolution forward and backward. $p$ is a spring-pawl secured to a rock-shaft, $p^1$, so as to engage with the pin $o$ of the wheel N when the cock B is open, and lock it in this position until released. The shaft $p^1$ extends through the plate $f^1$, and is provided on the front side thereof with an arm, $p^2$, which partially projects over the disk or wheel H, so as to be actuated by a pin, $r$, formed therewith.

The cock B being in a closed position, the wheel N rests with its pin $o$ against the stop $o^1$, as shown in Fig. 9. In winding the mainspring D, the friction of the arm M against the wheel L causes the latter to turn, thereby turning the wheel N until the pin $o$ thereof strikes the stop $o^2$, when the spring-pawl $p$ engages with the pin $o$, and locks the wheel N in this position. The cock B is, by this quarter-turn of the wheel N and shaft $h$, turned from a closed into an open position. The wheel N being no longer movable, the wheel L remains also stationary, and the arm M, during the further winding of the spring, rides over the stops $m'$ of the wheel L, which it is enabled to do by reason of its beveled side, until the mainspring is completely wound up, when the arm M is held with its perpendicular side against one of the stops $m'$ by the tension of the mainspring tending to turn the wheel L backward, but being prevented from doing so by the wheel N being locked. The train of gear-wheels E $E^1 E^2 E^3$ is now set in motion by the force of the mainspring D, and transmits its motion by means of the gear-wheels G $G^1 G^2$ to the wheel $G^3$, which by frictional contact rotates the disk H, to which the index-hand H' is attached. The pin $r$ of the disk H, in rotating, strikes the arm $p^2$, whereby the spring-pawl $p$ is withdrawn from the pin $o$ of the wheel N, thereby releasing the latter, and permitting the same to be swung back to its former position by the force of the mainspring D acting upon the wheel N through the arm M and wheel L. In this manner the plug of the cock B is closed.

The train of gear-wheels E $E^1 E^2 E^3$ are preferably so arranged that the index-hand H' will revolve once in twelve hours, the hours being marked on the dial-plate C'. The pin $r$ is so placed on the disk H that the wheel N will be released and the cock B turned off when the index-hand H' reaches the twelfth hour, so that the figure 12 on the dial-plate will be the starting-point of the mechanism. By turning the index-hand H' back from the figure 12 on the dial-plate any desired distance, and then starting the mechanism, the cock B will be open during the time which the index-hand H' requires for traveling to the figure 12 or starting-point on the dial-plate, so that when the index-hand is placed upon the figure 2, 3, or any other figure, the cock will be open two, three, or any other desired number of hours, and at the expiration of that time be closed automatically.

My improved apparatus is more especially designed to be used with street-lamps, for insuring the turning off of the same at the proper time, the stop-cock being opened by winding the mainspring, the index-hand set to the number of hours during which the lamp is required to burn, and the gas turned off automatically at the expiration of that time, as hereinbefore described.

It is obvious, however, that my improved apparatus is applicable in all cases where a stop-cock is required to be closed after having been open for a certain predetermined length of time. The hand $g'$ on the shaft of the gear-wheel G' sums up the distances traveled by the main index-hand H', one revolution of the hand $g'$ indicating that the cock B has been open twelve hours, while the wheel K moves one notch for every revolution of the wheel G' and hand $g'$, and thus indicates the number of times the cock B has been open for twelve hours, so that the total time during which the lamp has been burned in a certain period of time can be readily computed. These additional registering devices are, however, not absolutely essential, and may be used or not, as may be preferred.

Having thus fully described my invention, what I claim as new, and desire to secure by Letters Patent, is—

1. The combination, with the mainspring and case D D', and train of gear-wheels and escapement E $E^1 f$, of the gear-wheel L, connected with the shaft $d$, and segment or oscillating gear-wheel N, connecting with the plug of the stop-cock, so that the wheel N is given about a quarter-turn upon winding the mainspring, thereby opening the cock, and returned to its former position automatically after a certain length of time, thereby closing the cock, substantially as hereinbefore set forth.

2. The combination, with the spring D and shaft $d$, of the wheel L, provided with stops $m'$, arm M, secured to shaft $d$, and wheel N, substantially as and for the purpose hereinbefore set forth.

3. The combination, with the spring D and wheel L, of the wheel N, provided with pin $o$ and fixed stops $o^1 c^2$, substantially as and for the purpose hereinbefore set forth.

4. The combination, with the spring D and wheel L, of the oscillating wheel N, provided with stud $o$, stops $o^1 o^2$, secured to the frame and spring-pawl $p$ so that the oscillations of the wheel N are limited by the fixed stops, and said wheel locked in position by the pawl, when the cock is open, substantially as and for the purpose hereinbefore set forth.

5. The combination, with the oscillating wheel N, pawls $p p^2$, and rock-shaft $p^1$, of the rotating disk H, provided with projecting stud $r$, for releasing the pawl $p$, substantially as hereinbefore set forth.

6. The combination, with the cock B, main-spring D, and time mechanism, of the wheel $G^3$, provided with tooth $k$ and the registering-wheel K, substantially as and for the purpose hereinbefore set forth.

7. The combination, with the cock B and time mechanism, of the wheel $G^3$, driven thereby and turning loosely on the fixed arbor $h$, with the disk H, to which the hand H' is secured, substantially as and for the purpose hereinbefore set forth.

T. T. FRYER.

Witnesses:
GEORGE H. SYKES,
CHARLES J. BUCHHEIT.